United States Patent
Budni et al.

(10) Patent No.: US 7,495,824 B2
(45) Date of Patent: Feb. 24, 2009

(54) INFRARED WAVEGUIDE OPTICAL PARAMETRIC OSCILLATOR

(75) Inventors: Peter A. Budni, Nashua, NH (US); Scott D. Setzler, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/119,570

(22) Filed: May 2, 2005

(65) Prior Publication Data
US 2006/0245042 A1 Nov. 2, 2006

(51) Int. Cl.
*G02F 1/35* (2006.01)
*G02F 2/02* (2006.01)

(52) U.S. Cl. ................................ 359/330; 359/326

(58) Field of Classification Search ......... 359/326–332, 359/330; 372/21–22; 385/330
See application file for complete search history.

(56) References Cited

U.S. PATENT DOCUMENTS

| | | | | |
|---|---|---|---|---|
| 5,321,707 A * | 6/1994 | Huber | ................. | 372/6 |
| 5,400,173 A * | 3/1995 | Komine | ................. | 359/330 |
| 5,650,856 A * | 7/1997 | Morse | ................. | 356/436 |
| 5,671,241 A * | 9/1997 | Stamm et al. | ................. | 372/20 |
| 5,835,650 A * | 11/1998 | Kitaoka et al. | ................. | 385/49 |
| 5,847,861 A * | 12/1998 | Kafka et al. | ................. | 359/330 |
| 5,912,910 A * | 6/1999 | Sanders et al. | ................. | 372/22 |
| 6,021,141 A * | 2/2000 | Nam et al. | ................. | 372/20 |
| 6,114,994 A * | 9/2000 | Soref et al. | ................. | 342/372 |
| 6,154,310 A * | 11/2000 | Galvanauskas et al. | ................. | 359/328 |
| 6,181,463 B1 * | 1/2001 | Galvanauskas et al. | ................. | 359/330 |
| 6,282,014 B1 * | 8/2001 | Long | ................. | 359/330 |
| 6,344,921 B1 * | 2/2002 | Galvanauskas et al. | ................. | 359/332 |
| 6,501,597 B1 * | 12/2002 | Pitt et al. | ................. | 359/349 |
| 6,711,183 B1 * | 3/2004 | Mizuuchi et al. | ................. | 372/22 |
| 6,807,200 B2 * | 10/2004 | Phua et al. | ................. | 372/21 |
| 2001/0033723 A1 * | 10/2001 | Yoo | ................. | 385/122 |
| 2002/0126370 A1 * | 9/2002 | Broderick et al. | ................. | 359/332 |
| 2002/0158260 A1 * | 10/2002 | Yamamoto et al. | ................. | 257/79 |
| 2003/0039023 A1 * | 2/2003 | Romagnoli et al. | ................. | 359/326 |
| 2003/0118347 A1 * | 6/2003 | Papaparaskeva et al. | ................. | 398/147 |
| 2004/0125434 A1 * | 7/2004 | Kumar et al. | ................. | 359/330 |
| 2005/0238070 A1 * | 10/2005 | Imeshev et al. | ................. | 372/21 |

OTHER PUBLICATIONS

Jani et al, "Pump Wavelength Tuning Of A Near-Infrared Optical Parametric Oscillator", Applied Optics, vol. 31, No. 12, Apr. 20, 1992, pp. 1998-2000.*
Eyres et al, "All-Epitaxial Fabrication Of Thick, Orientation-Patterned GaAs Films For Nonlinear Optical Frequency Conversion", Applied Physics Letters, vol. 79, No. 7, Aug. 13, 2001, pp. 904-906.*

* cited by examiner

*Primary Examiner*—Michelle R Connelly Cushwa
*Assistant Examiner*—Rhonda S Peace
(74) *Attorney, Agent, or Firm*—Daniel J. Long; Antony P. Ng; Dillon & Yudell LLP

(57) ABSTRACT

An integrated broad spectral band waveguide optical parametric oscillator (OPO) is disclosed. In accordance with a preferred embodiment of the present invention, a single pump laser is used to drive multiple oscillator (OPO) channels. The waveguide OPO is preferably made of orientation patterned gallium arsenide. The pump laser can be, for example, a fiber laser, a diode laser or a solid-state laser.

13 Claims, 4 Drawing Sheets

INFRARED WAVEGUIDE OPTICAL PARAMETRIC OSCILLATOR

BACKGROUND OF THE INVENTION

1. Technical Field

The present invention relates to optical parametric oscillators in general, and in particular to infrared waveguide optical parametric oscillators. Still more particularly, the present invention relates to an integrated broad spectral band waveguide optical parametric oscillator.

2. Description of Related Art

An optical parametric oscillator (OPO) is a non-linear device that converts incident photons into photon pairs when the incident photons are optically excited at a power per unit area above a specific threshold level. As a function of wavelength, the threshold level is a characteristic of the non-linear material and the resonator of an OPO. An OPO is usually embodied in one of the two following forms: either in a doubly-resonant oscillator in which both generated optical beams are resonated or in a singly-resonant oscillator in which only one of the generated optical beams is in resonance.

The usage of OPOs for commercial and scientific applications demands concurrent achievement of several requirements. In particular, widely tunable laser radiation having high frequency stability and narrow linewidth can be utilized in applications within the field of high-resolution spectroscopy and metrology. Continuous-wave operation of laser sources is required to achieve linewidths on the order of one megahertz or less. Various continuous-wave lasers are available for different portions of the optical spectrum, for example, laser diodes in the 630-2000 nm range, titanium-sapphire lasers in the 710-1100 nm range, dye lasers in the 400-800 nm range and color center lasers in the 2.0-3.5 μm spectral regions.

The generation of broadband infrared laser radiation generally requires multiple lasers and wavelength shifters. The usage of multiple lasers and wavelength shifters, which are typically discrete components, requires a great deal of laser and optomechanical engineering. The present disclosure provides an improved broad spectral band waveguide OPO that is capable of generating broadband infrared laser radiation without using multiple lasers and discrete wavelength shifters.

SUMMARY OF THE INVENTION

The present invention mitigates the severe difficulties encountered in generating broadband infrared radiation in the 3 to 14 microns spectral region. In accordance with a preferred embodiment of the present invention, a single pump laser is used to drive multiple waveguide optical parametric oscillator (OPO) channels. The waveguide OPO is preferably made of orientation patterned gallium arsenide. The pump laser can be, for example, a fiber laser, a diode laser or a solid-state laser.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
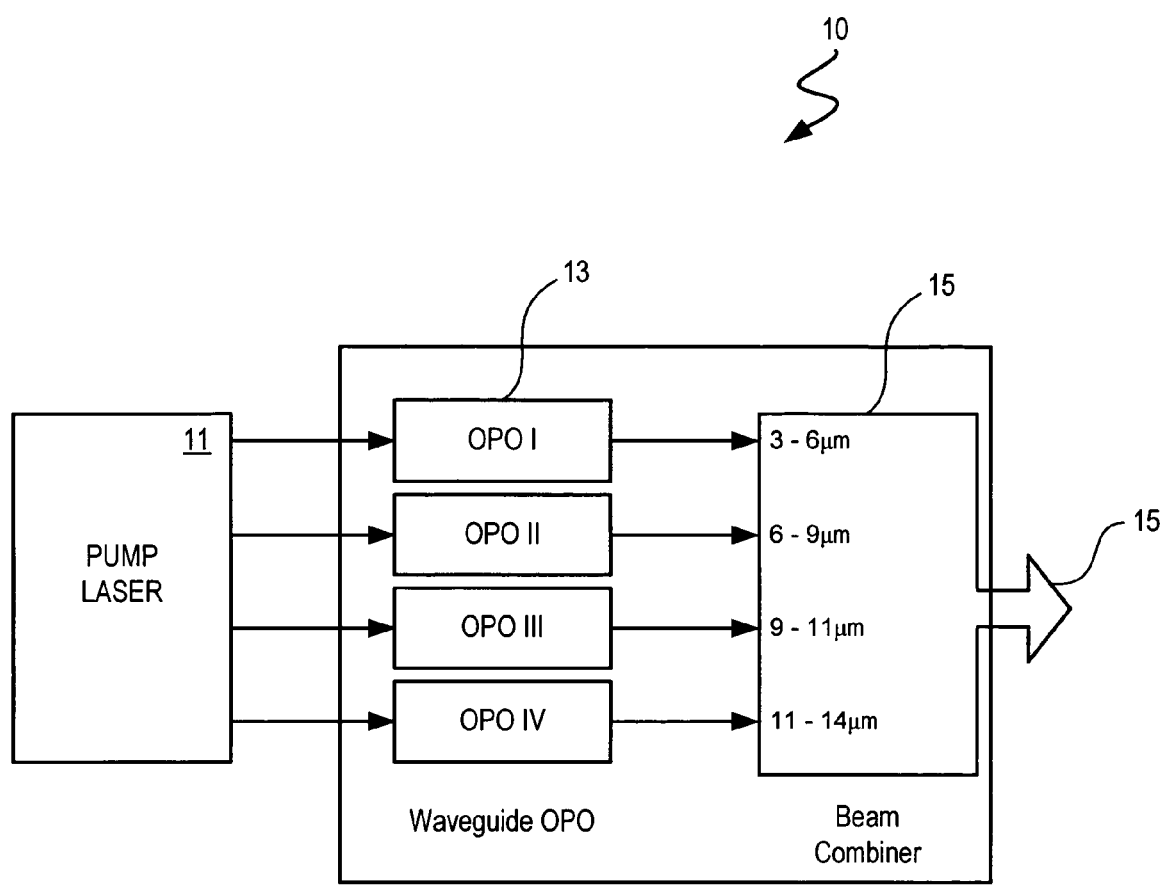
FIG. 1 is a block diagram of a waveguide optical parametric oscillator (OPO) configuration, in accordance with a preferred embodiment of the present invention.

Referring now to the drawings and in particular to FIG. 1, there is illustrated a block diagram of a waveguide optical parametric oscillator (OPO) configuration, in accordance with a preferred embodiment of the present invention. As shown, a waveguide OPO configuration 10 includes a pump laser 11 coupled to a converter chip 12. Converter chip 12 contains a waveguide OPO 13 and a beam combiner 14. Waveguide OPO 13 is shown to have four channels, but it is understood by those skilled in the art that any number of channels can be used. Each of the four channels is responsible for a specific range of the radiation spectrum. For the present embodiment, channel 1 is responsible for 3-6 μm spectral regions, channel 2 is responsible for 6-9 μm spectral regions, channel 3 is responsible for 9-11 μm spectral regions, and channel 4 is responsible for 11-14 μm spectral regions. Beam combiner 14 combines the four channels from waveguide OPO 13 into a single output 15.

Pump laser 11 is preferably a two-micron Thulium fiber laser; though, other types of pump laser, such as a diode laser or a solid-state laser, can also be utilized. Waveguide OPO 13 is preferably a quasi-phase matched (QPM) orientation patterned gallium arsenide waveguide (OPGaAs) OPO.

OPGaAs is a relatively new QPM non-linear optical (NLO) material that has a tremendous potential for advancing numerous frequency conversion applications in the infrared field. Very few laser experiments have been performed on OPGaAs materials due to the limited number of samples available. Nonetheless, the advances thus far have been sufficient for proof of principle. One advantage of OPGaAs is that it offers a practical way to create a QPM structure in an infrared material that lacks birefringence yet possesses all of the other qualities that are desirable in a NLO crystal.

Waveguide OPO 13 is a threshold device that requires a strong non-linear drive in order to operate efficiently. One way to achieve high drive intensities is by using waveguides. The conversion efficiency of a non-linear device can be increased by tightly confining the optical fields over long interaction lengths.

An OPGaAs waveguide OPO 13 can take advantage of an unpolarized fiber laser source, such as pump laser 11, to allow the use of orthogonal polarizations as a non-linear drive. The energy from pump laser 11 is partitioned within waveguide OPO 13 that covers a 3 to 14 micron wavelength span of spectral segments. Waveguide OPO 12 confines the infrared radiation and allows for long interaction lengths. Waveguide OPO 12 also allows for rapid temperature tuning by changing the refractive index, and hence the coherence length, within the QPM structure of waveguide OPO 12.

Figure 2:
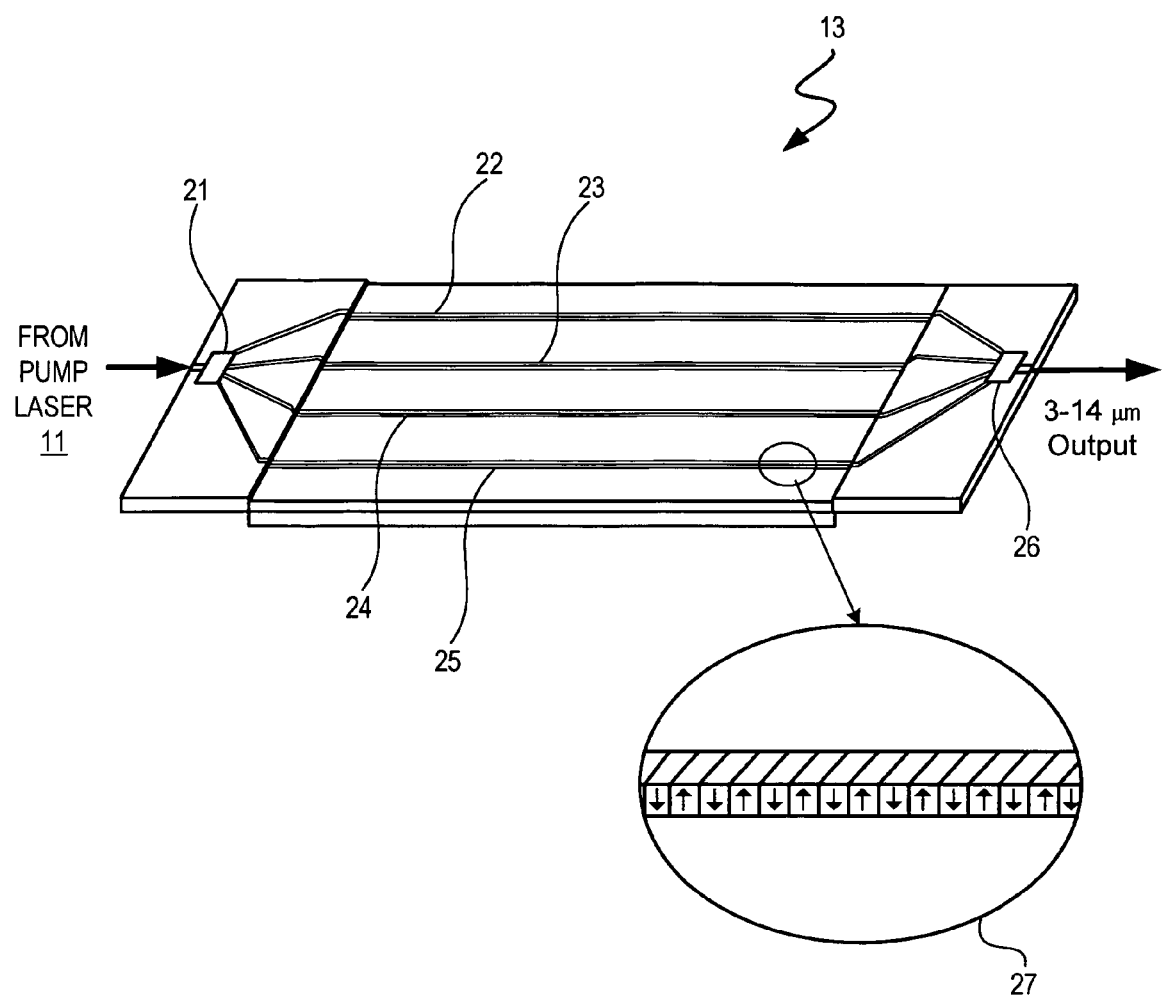
FIG. 2 graphically illustrates an integrated waveguide OPO, in accordance with a preferred embodiment of the present invention.

With reference now to FIG. 2, there is graphically illustrated waveguide OPO 13, in accordance with a preferred embodiment of the present invention. As shown, waveguide OPO 13 includes a four-way optical switch 21 as an input for coupling to pump laser 11 (from FIG. 1). After entering through four-way optical switch 21, Thulium pump radiation from pump laser 11 is routed to waveguides 22-25 successively (or simultaneously when using a power divider instead of an optical switch). Each of waveguides 22-25 handles one of the four above-mentioned channels. With waveguides 22-25, the broad spectral range requirements can be addressed. Radiation from waveguides 22-25 are subsequently combined by a beam combiner 26 to provide a broadband infrared radiation in the range of 3-14 μm.

Waveguide OPO 13 is preferably attached to a thermoelectric cooler (not shown) in order to spectrally scan the output radiation. Laser pump 11 can also be simultaneously scanned for increased scanning versatility.

Each OPO resonator within waveguides 22-25 is formed by using fiber Bragg gratings as mirrors to close a resonator cavity. Such an integrated waveguide OPO can be grown in successive stages. The fiber Bragg gratings can be burned and the alignment of the fiber Bragg grating is inherently simple by virtue of the waveguide properties of the OPGaAs medium. The alternating periodic structures of the quasi-phase matched OPGaAs medium are shown in an enlargement 27.

Figure 3:
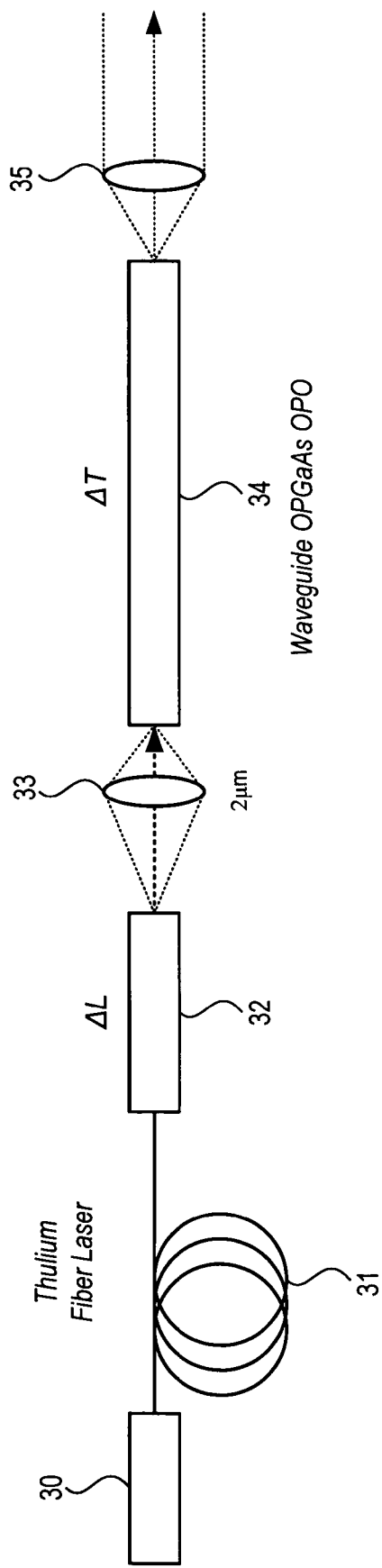
FIG. 3 is a schematic diagram of a waveguide within the integrated waveguide OPO from FIG. 2, in accordance with a preferred embodiment of the present invention.

Referring now to FIG. 3, there is depicted a schematic diagram of a waveguide within waveguide OPO 13, in accordance with a preferred embodiment of the present invention. As shown, a fiber Bragg grating 30, which acts as a mirror, is connected to one end of a fiber cable 31 that is part of pump laser 11 (from FIG. 1). The other end of fiber cable 31 is connected to a mirror output coupler 32. Laser radiation from mirror output coupler 32 is directed to a waveguide 34 via a pump coupling lens 33. At the output of waveguide 34, laser radiation is directed through a coliminating lens 35.

The tuning of pump laser 11 can be achieved by varying the length of fiber Bragg grating 30 (grating strain tuning). Such method can increase or decrease the period distance and, in turn, shifts the spectral feedback to the resonator through the fiber gain medium. Tuning ranges presently available are around 40 nm. Such large tuning range allows for a broad region to be covered by a single non-polarized waveguide, such as waveguide 34.

Waveguide 34 can be tuned by either controlling the emission spectrum of pump laser 11 (controlled by grating strain tuning) or by the controlling the temperature of waveguide 34. The tuning of waveguide 34 can be achieved by varying the temperature.

Figure 4:
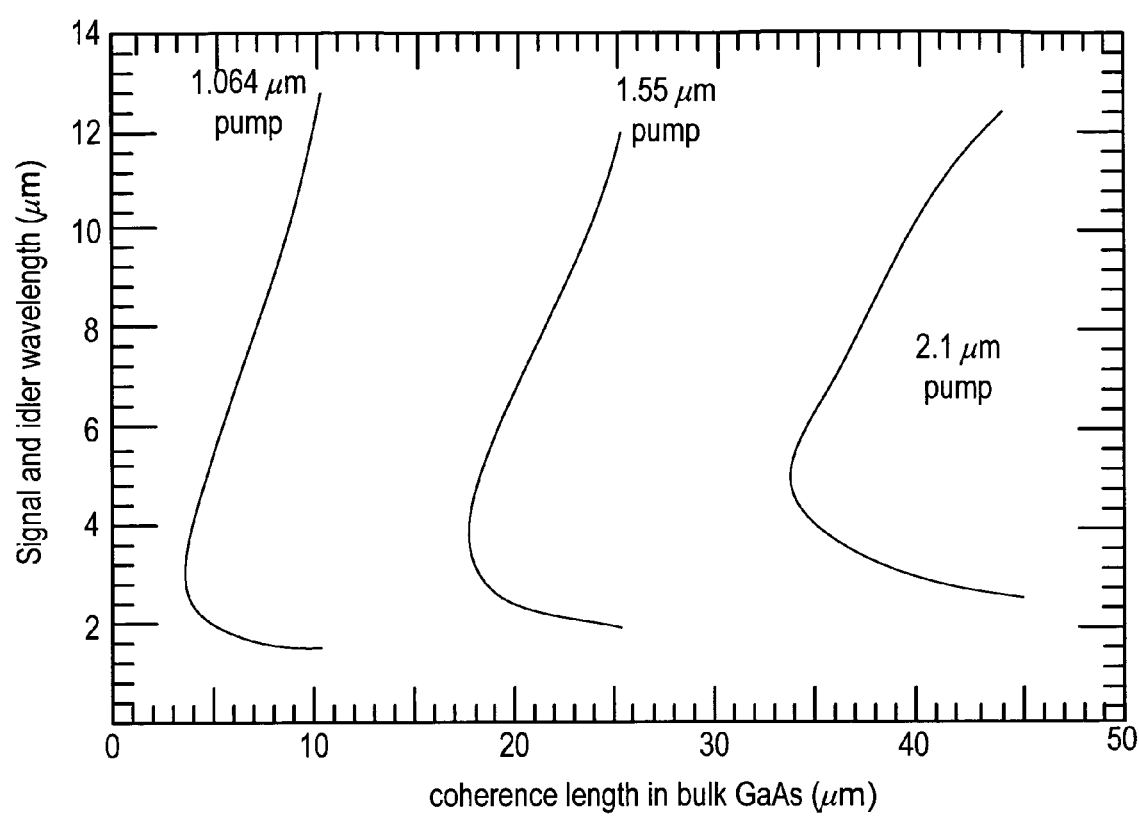
FIG. 4 is a chart illustrating the phase-matching characteristics of an integrated waveguide OPO pumped by various laser sources, in accordance with a preferred embodiment of the present invention.

With reference now to FIG. 4, there is depicted a chart illustrating the phase-matching characteristics of an integrated waveguide OPO pumped by various laser sources, in accordance with a preferred embodiment of the present invention. With a two-micron pump source, such as pump laser 11 from FIG. 1, the domains in the QPM structure are between 30 μm and 40 μm in order to cover the required spectral ranges, which has high potential for waveguide fabrication. In addition with a suitable broadband tunable pump laser, a single waveguide may be used, provided multimode spatial profiles are not an issue.

As has been described, the present invention provides an integrated broad spectral band waveguide OPO using OPGaAs.

While the invention has been particularly shown and described with reference to a preferred embodiment, it will be understood by those skilled in the art that various changes in form and detail may be made therein without departing from the spirit and scope of the invention.

What is claimed is:

1. An apparatus for generating broad spectral band radiation, said apparatus comprising:
    a pump laser; and
    a waveguide optical parametric oscillator having a multi-way optical switch, wherein said waveguide optical parametric oscillator is made of orientation patterned gallium arsenide, wherein output wavelength of said waveguide optical parametric oscillator is configured to be tuned by varying the temperature of said waveguide optical parametric oscillator.

2. The apparatus of claim 1, wherein said pump laser is a fiber laser.

3. The apparatus of claim 1, wherein said pump laser is a diode laser.

4. The apparatus of claim 1, wherein said pump laser is a solid-state laser.

5. The apparatus of claim 1, wherein said pump laser is a Thulium fiber laser.

6. The apparatus of claim 1, wherein said pump laser is linearly polarized.

7. The apparatus of claim 1, wherein said pump laser is non-polarized.

8. The apparatus of claim 1, wherein said pump laser is circularly-polarized.

9. The apparatus of claim 1, wherein said apparatus contains a plurality of waveguide structures.

10. The apparatus of claim 1, wherein a cavity of said waveguide optical parametric oscillator is formed using integrated Bragg reflectors.

11. An apparatus for generating broad spectral band radiation, said apparatus comprising:
    a pump laser; and
    a waveguide optical parametric oscillator having a beam combiner, wherein said waveguide optical parametric oscillator is made of orientation patterned gallium arsenide, wherein output wavelength of said waveguide optical parametric oscillator is configured to be tuned by varying the temperature of said waveguide optical parametric oscillator.

12. The apparatus of claim 11, wherein said pump laser is circularly-polarized.

13. The apparatus of claim 11, wherein a cavity of said waveguide optical parametric oscillator is formed using integrated Bragg reflectors.

* * * * *